UNITED STATES PATENT OFFICE.

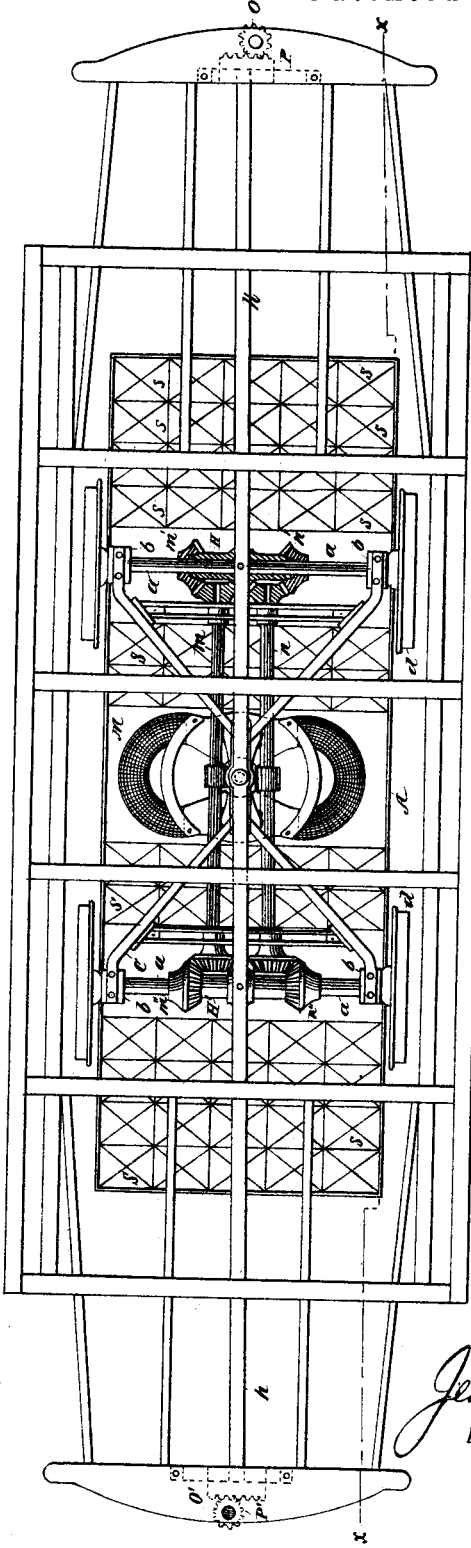

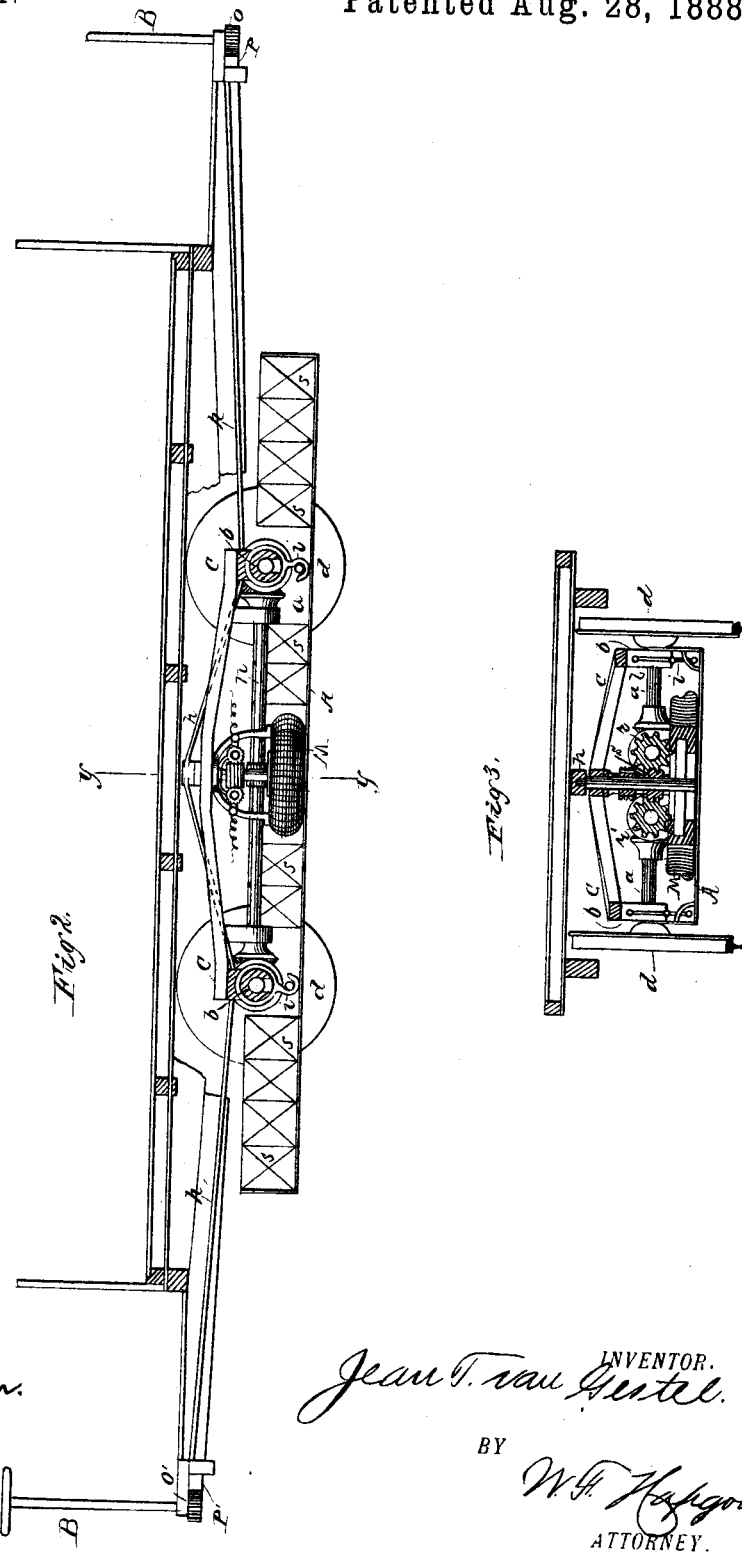

JEAN T. VAN GESTEL, OF NEW YORK, N. Y., ASSIGNOR TO THE VAN GESTEL MANUFACTURING COMPANY, OF NEW YORK.

ELECTRIC TRAM-CAR.

SPECIFICATION forming part of Letters Patent No. 388,514, dated August 28, 1888.

Application filed September 10, 1887. Serial No. 249,319. (No model.)

*To all whom it may concern:*

Be it known that I, JEAN T. VAN GESTEL, a subject of the King of The Netherlands, residing in New York, in the county and State of New York, have invented certain new and useful Improvements in Electric Tram-Cars, of which the following is a specification.

Heretofore the motors for tram-cars propelled by electricity have either been placed within the car, where they occupy valuable space, or fixed underneath the car-body, where they are difficult of access for cleaning or repairs, and are liable to derangement by the movement between the car-body and the wheels which is permitted by the springs. It has also been customary where secondary electric batteries are used to furnish power to place the batteries under the seats within the car, and when the batteries are exhausted either the car must be withdrawn from use for some hours while the batteries are being recharged, or the batteries must all be removed one at a time and replaced by others, which requires considerable time and a large force of men.

The object of my invention is to avoid these difficulties and to provide a method of construction which may be easily applied to any of the horse-cars at present used.

I attain these objects by the device illustrated in the accompanying drawings, where—

Figure 1 is a plan view, partly in section, showing frame-work of the floor of a car with my improved arrangement below. Fig. 2 is a sectional elevation on line $x$ $x$ of Fig. 1. Fig. 3 is a transverse section on line Y Y, Fig. 3.

Similar letters represent similar parts in all the figures.

Upon the axles $a$ of the car are placed bearings $b$, which carry a frame, $c$, which supports the upper end of the shaft of the electric motor M, and also carries the shafting for connecting the motor with the axles $a$ to drive the car. Connected with these bearings $b$ are hooks or links $i$ $i$, which support a platform or box, A, which is thus carried underneath the car and between the wheels $d$. Upon this platform or box is mounted the motor M, to which are geared two shafts, $m$ and $n$, which in turn operate the bevel-gears $m'$ $m''$ $n'$ $n''$, which turn loosely upon the axles of the car. A friction-clutch, H H', upon each axle connects either of the pairs of gears $m'$ $n''$ or $m''$ $n'$ with the axles, and thus the car is caused to move in one direction or the other, as may be desired, the motor always turning in the same direction.

A rod, $h$, is pivoted upon the frame $c$ at the center of the car, and its arms connect with the clutches H and H', and, extending to the ends of the car, terminate in toothed sectors $p$ $p'$, which gear with the pinions $o$ $o'$ upon the shaft of the hand-wheel B, by means of which the rod $h$ may be swung from one side to the other, as it may be desired, to shift the clutches H H'. The secondary batteries used to supply power for the motor may also be placed upon this platform A, as indicated at S S in the drawings, and both the batteries and the motor may be covered in any suitable manner to protect them from dirt.

It will be seen from the above that the entire weight of the motor and batteries is supported directly upon the axles of the car and not by the body. Thus there is no necessity for making the body of a car any stronger or heavier than at present, or to make any alterations in the bodies of horse-cars now in use, to enable them to be used with electric power. It will also be seen that as the motor and the connecting gearing are supported directly upon the axles and not attached to the body of the car, the movement of the body upon its springs does not need to be provided for.

When it is desired to charge the batteries or to examine the motor, the platform A is removed from the car, carrying with it both the batteries and the motor, but leaving the shafts and gearing in their places. To do this the clutch-rod $h$ is set at its central position, when the clutches H and H' are both disengaged from the gears $m'$ $n'$, &c., and the shafts $m$ and $n$ are free from connection with both axles. The hooks $i$ $i$ are now released from the platform, which may be lowered clear of the axles when the car is drawn away. When the platform A is lowered, the spur-gears $r$ $r'$ revolve freely with the shafts $m$ $n$ and allow the worm $s$ to be withdrawn from between them.

The gearing which connects the motor with the axles is not disturbed, and is left attached to the frame $c$. The batteries may now be recharged, the motor cleaned, and any adjustments necessary may be made without trouble.

If it is desired to use the car at once, a second box with its motor and the batteries charged may be at once attached to the car, which can start immediately for service. Thus, if a car need repairs the motor and batteries may be used on other cars, and if a motor is out of order another may be substituted without it being necessary to withdraw the car also from service.

It is evident that this method of attaching electric motors to tram-cars may be employed when the power is derived from other sources than batteries, and I do not limit myself to the use of this construction in combination with batteries.

It is also evident that the methods of gearing the motor with the wheels different from the one illustrated may be employed, and I do not limit myself to this particular arrangement.

What I claim, and desire to secure by Letters Patent, is—

1. In an electric tram car, the combination of the truck of the car with a platform detachably suspended from the axles, an electric motor and electric batteries mounted upon said platform, and suitable gearing connecting the motor with the axles of the car, as herein described.

2. In an electric tram-car, the combination of the platform or box A, motor M, shafts $m$ and $n$, gears $m'$ $m''$ $n'$ $n''$, clutches H H', and rod $h$, with the axles of the car and wheels of the car, as described.

3. In an electric tram-car, the combination of the axles $a$ $a$, and the box or platform A, removably attached thereto, with the motor M, suitable gearing connecting the motor with the axles, and the frame $c$, supporting said gearing, all arranged as and for the purpose set forth.

4. In an electric tram car, the combination of the truck of the car and the platform A, attached to the axles thereof, and the batteries S and motor M, mounted upon said platform, with the gear-wheels $m'$ $m''$ $n'$ $n''$ upon the axles $a$ $a$ of the truck, and the clutches H H', operated by the rod $h$ from the platform of the car by means of the hand-wheel B and pinion $o$, and rack $p$, to connect said gear-wheel with either axle, in the manner described.

5. In an electric tram car, the combination of the axles of the car $a$ $a$ with the bearings $b$, links or hooks $i$ $i$, platform A, and motor M, geared to said axles, as and for the purpose set forth.

JEAN T. VAN GESTEL.

Witnesses:
    THOS. KILVERT,
    E. H. AYRE.